US008850032B2

(12) United States Patent
Chris et al.

(10) Patent No.: US 8,850,032 B2
(45) Date of Patent: Sep. 30, 2014

(54) SYSTEM AND METHOD OF RESOLVING A DOMAIN NAME

(75) Inventors: Bulley Chris, Mississauga (CA); Robert Graham, Guelph (CA); Michael Ladanyi, Toronto (CA)

(73) Assignee: CRB Consulting Inc., Mississauga (CA)

( * ) Notice: Subject to any disclaimer, the term of this patent is extended or adjusted under 35 U.S.C. 154(b) by 278 days.

(21) Appl. No.: 13/531,909

(22) Filed: Jun. 25, 2012

(65) Prior Publication Data

US 2013/0346477 A1 Dec. 26, 2013

(51) Int. Cl.
  *G06F 15/16* (2006.01)
(52) U.S. Cl.
  USPC ........... 709/227; 709/203; 709/217; 709/220; 709/230; 709/242
(58) Field of Classification Search
  USPC .................. 709/203, 217, 220, 227, 230, 242
  See application file for complete search history.

(56) References Cited

U.S. PATENT DOCUMENTS

| 7,280,999 | B2 * | 10/2007 | Chung et al. .................. 1/1 |
| 8,543,732 | B2 * | 9/2013 | Ryan .............................. 709/245 |
| 2004/0044791 | A1 * | 3/2004 | Pouzzner ...................... 709/245 |
| 2013/0346477 | A1 * | 12/2013 | Chris et al. ................... 709/203 |

* cited by examiner

*Primary Examiner* — Michael Y Won
(74) *Attorney, Agent, or Firm* — Robert Graham; Ridout & Maybee LLP (57) ABSTRACT

A method of resolving a domain name that includes a non-LDH character, involves a client computer receiving a domain name update notification for a first computer server that has a LDH domain name comprising at least one character but excluding non-LDH characters. In response, the client computer downloads a configuration payload from a registration server that maintains an association between the first computer server and a second computer server. The configuration payload links the first computer server to a non-LDH domain name associated with the second computer server and configures the client computer to determine an identification of the second computer server from the first LDH domain name. The non-LDH domain name has at least one non-LDH character. The client computer uses the identification of the second computer server to establish a communication session therewith while displaying the associated non-LDH domain name.

20 Claims, 5 Drawing Sheets

SYSTEM AND METHOD OF RESOLVING A DOMAIN NAME

FIELD

This patent application relates to a system and method of resolving a domain name and, in particular, to a system and method of resolving a domain name including a non-standard character.

BACKGROUND

A computer server is accessible on a network at its uniquely-assigned internet protocol (IP) address. As IP addresses as not easy for a computer user to remember, computer users may access a computer server via a unique plain text American Standard Code for Information Interchange ("ASCII") domain name that is associated with the computer server's IP address. Each domain name has multiple components, separated by a period ".". The right-most portion of the domain name indicates the top-level domain of the domain name (e.g. ".com", ".net", ".org", ".ca"). Portions of the domain name appearing to the left of the top-level domain name indicate the subdomains of the top-level domain. For example, in the domain name www.examplename.com, ".com" is the top-level domain, "examplename" is a subdomain of the ".com" top-level domain, and "www" is a subdomain of "examplename.com".

Domain name authorities currently limit domain names to characters that are selected from ASCII letters "A-Z", numeric digits "0-9", and hyphens "-" (i.e. "LDH" characters). However, for marketing, branding, or other reasons, a web site owner might want to have its web site associated with a domain name that contains one or more non-LDH characters.

SUMMARY

This patent application describes a method and client computer that is configured to resolve a domain name that includes at least one non-LDH character. This patent application also describes a system and method of registering a domain name that includes at least one non-LDH character.

The method of resolving a domain name may involve a client computer receiving a domain name update notification for a first computer server. The first computer server has a LDH domain name comprising at least one character but excluding non-LDH characters. In response to the update notification, the client computer may download a configuration payload from a registration server. The registration server maintains an association between the first computer server and a second computer server. The configuration payload links the first computer server to a non-LDH domain name associated with the second computer server, and configures the client computer to determine an identification of the second computer server from the LDH domain name. The non-LDH domain name has at least one non-LDH character. The client computer uses the identification of the second computer server to establish a communication session therewith while displaying the associated non-LDH domain name.

The client computer comprises a display device and a data processor in communication with the display device. The data processor is configured to receive a domain name update notification and a configuration payload. The configuration payload links a first computer server and a non-LDH domain name that is associated with a second computer server, and configures the client computer to determine an identification of the second computer server from a LDH domain name. The non-LDH domain name has at least one non-LDH character. The LDH domain name is associated with the first computer server and comprises at least one character but excludes non-LDH characters. The data processor is also configured to use the identification of the second computer server to establish a communication session with the second computer server while displaying the associated non-LDH domain name on the display device.

The method of registering a domain name involves a registration server receiving a registration request comprising a non-LDH domain name. The non-LDH domain name has at least one non-LDH character. The registration server facilitates registration of a LDH domain name with a domain name server. The LDH domain name is associated with the non-LDH domain name and comprises at least one character but excludes non-LDH characters. In accordance with an outcome of the registration facilitating, the registration server maintains an association between the LDH domain name and the non-LDH domain name, and may transmit a configuration payload to a client computer. The configuration payload facilitates establishment of a communication session between the client computer and a computer server associated with the non-LDH domain name.

BRIEF DESCRIPTION OF THE DRAWINGS

The aforementioned methods will now be described, by way of example, with reference to the accompanying drawings, in which.

DETAILED DESCRIPTION

Figure 1:
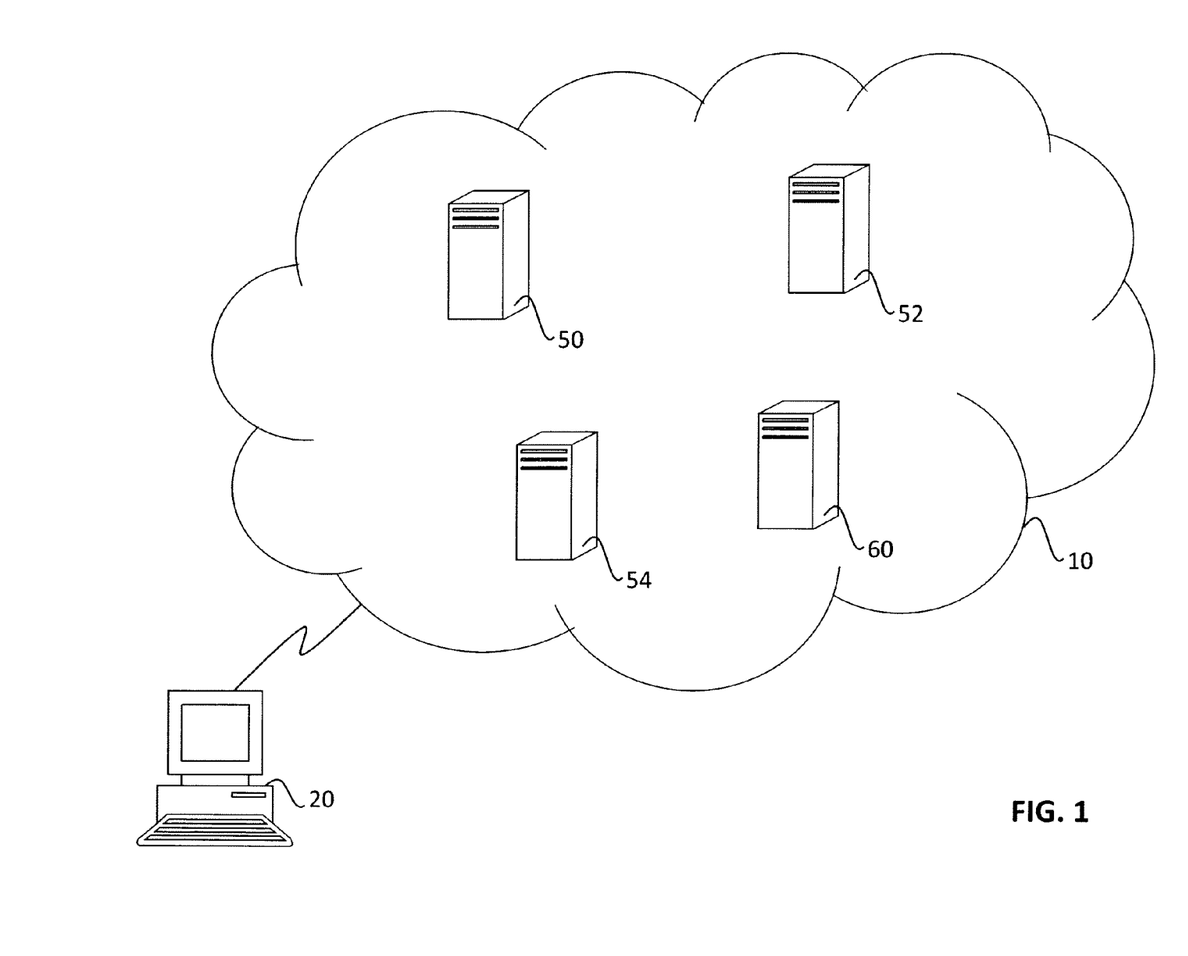
FIG. 1 is a schematic diagram of a communications network for implementing the method of resolving a domain name.

Referring to FIG. 1, there is shown a communications network 10, and a client computer 20 connected to the communications network 10. The communications network 10 includes, a first computer server 50, a domain name server ("DNS") 52, a second computer server 54, and a registration server 60. Although the communications network 10 is shown being connected to only one client computer 20, and comprising only the two computer servers 50, 54, preferably the communications network 10 is implemented as a wide area network, such as the Internet, and is connected to a plurality of client computers 20 and comprises a plurality of computer servers 50, 54.

The first computer server 50 has a LDH domain name that comprises only LDH ("letter, digit, or hyphen") characters. The second computer server 54 has a non-LDH domain name that comprises one or more non-LDH characters. For example, any of the following non-exhaustive list of ASCII non-LDH characters may be included in the non-LDH domain name: "!", "@", ",", "#", "$", "%", "^", "&", "*", "(", ")", "/", "=", "+", "[", "]", "{", "}", "'", """, "|", "\", "?", "<", ">", "~", "_", ":", ";" and ".". The second computer server 54 may also have a LDH domain that comprises only LDH characters.

Typically, the first and second computer servers 50, 54 are each assigned respective unique Internet Protocol ("IP") addresses. Alternately, the first and second computer servers 50, 54 may have the same IP address.

The DNS 52 is configured as a conventional domain name server and maintains a registry for the IP address and the associated LDH domain name for the first computer server 50, and the IP address and the associated LDH domain name (if it exists) for the second computer server 54.

The registration server 60 maintains a database that links the LDH domain name of the first computer server 52 with the non-LDH domain name of the second computer server 54. If the second computer server 54 also has a LDH domain, preferably the database also links the LDH domain name of the first computer server 52 with the LDH domain name of the second computer server 54. Preferably, the registration server 60 is distinct from the first computer server 52 and from the second computer server 54. However, in one variation, the functionality of the registration server 60 is incorporated into the first computer server 52 and/or the second computer server 54.

Figure 2:
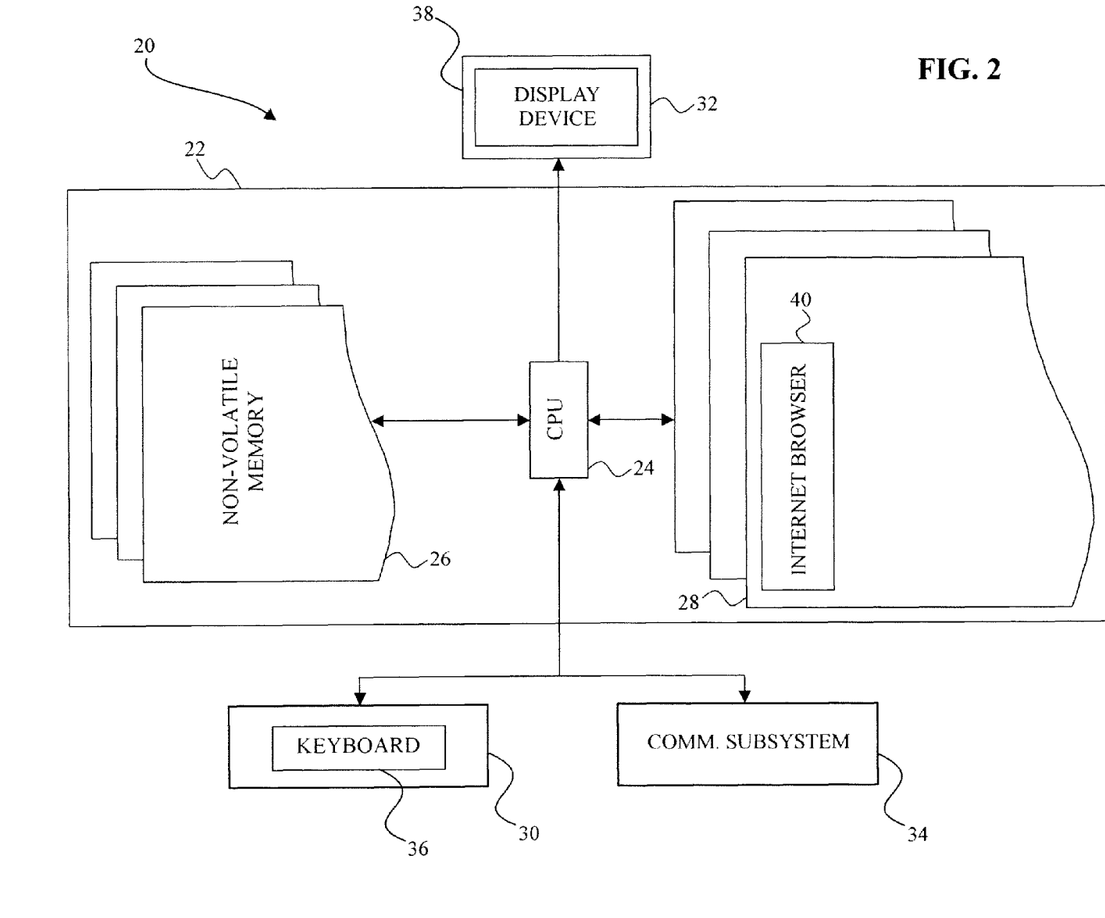
FIG. 2 is a schematic diagram of a client computer network of the communications system depicted in FIG. 1.

As shown in FIG. 2, the client computer 20 includes a data processor 22, an input/output subsystem 30, a display subsystem 32, and a communications system 34. The data processor 22 controls the overall operation of the client computer 20, and may comprise a microprocessor 24 in communication with non-volatile memory 26 and volatile memory 28.

The non-volatile memory 26 may comprise flash memory, read-only memory, one or more magnetic hard drives or other magnetic or optical media. The non-volatile memory 26 may include computer processing instructions, which when executed by the microprocessor 24, implement an operating system and computer programs. The computer processing instructions may be copied from the non-volatile memory 26 to the volatile memory 28 upon reset or power-up of the client computer 20, and executed by the microprocessor 24 out of the volatile memory 28. Alternately, the computer processing instructions may be executed by the microprocessor 24 out of the non-volatile memory 26.

The input/output subsystem 30, display subsystem 32, and communications system 34 are each in communication with the data processor 22. The input/output subsystem 30 may comprise a keyboard 36, or other input device for receiving input from a user of the client computer 20. The display subsystem 32 may comprise a display device 38 capable of displaying data or graphics on a display screen (not shown) of the display device 38 in accordance with data received by the display subsystem 32. Through use of the communications subsystem 34, the data processor 22 may communicate with one or more other computer systems or other computing devices either across local or wide area networks, using any wired or wireless network communication protocols.

The operating system of the data processor 22 allows the client computer 20 to operate the display subsystem 32 and the input/output subsystem 30, and to communicate with the communications system 34. As will be described in greater detail below, the operating system also allows the client computer 20 to receive, via the communications subsystem 34, a domain name update notification that notifies the client computer 20 that the first computer server 50 is associated with another computer server (i.e. the second computer server 54) that has a non-LDH domain name.

The operating system also allows the client computer 20 to receive from the registration server 60, via the communications subsystem 34, a configuration payload that directly, or indirectly, links the first computer server 50 to the non-LDH domain name associated with the second computer server 54. The configuration payload also facilitates establishment of a communication session between the client computer 20 and the second computer server 54 that is associated with the non-LDH domain name.

The configuration payload may identify the LDH domain name of the first computer server 50, and the non-LDH domain name of the second computer server 54 that is associated with the first computer server 50. If the second computer server 54 also has a LDH domain, the configuration payload may also identify the LDH domain name of the second computer server 54. Alternately, the configuration payload may configure the client computer 20 to indirectly identify the second computer server 54 from the LDH domain name, for example via the registration server 60.

The computer programs of the data processor 22 may include an Internet browser 40. The operation of the Internet browser 40 will be discussed in greater detail below. However, it is sufficient at this point to note that the Internet browser 40 may be configured to query the configuration payload with the LDH domain name of the first computer server 50 for an identification (e.g. the LDH domain name) of the second computer server 54. Alternately, the configuration payload may configure the Internet browser 40 to determine the identification of the second computer server 54 from the LDH domain name of the first computer server 50, via the registration server 60. The Internet browser 40 uses the identification of the second computer server 54 to establish a communication session with the associated second computer server 54 via the communications subsystem 34. The Internet browser 40 may establish the communication session with the second computer server 54 while displaying the associated non-LDH domain name on the display device 38.

The Internet browser 40 may also be configured to query the configuration payload with the non-LDH domain name of the second computer server 54 for the identification (e.g. the LDH domain name) of the second computer server 54. Alternately, the configuration payload may configure the Internet browser 40 to determine the identification of the second computer server 54 from the non-LDH domain name of the second computer server 54, via the registration server 60. The Internet browser 40 may be configured, such that if the browser 40 is able to locate an entry for the second computer server 54 in the configuration payload (e.g. an entry that identifies the non-LDH domain name of the second computer server 54) or is able to determine the identification of the second computer server 54 from the registration server 60, to use the identification of the second computer server 54 to establish a communication session with the second computer server 54 via the communications subsystem 34. The Internet browser 40 may establish the communication session with the second computer server 54 while displaying the associated non-LDH domain name on the display device 38.

The Internet browser 40 may also be configured, such that if the browser 40 is unable to determine an identification for the second computer server 54, to attempt to parse the non-LDH domain name into a LDH domain name. If parsing is successful, the browser 40 may then establish a communication session with the second computer server 54 at the LDH domain name that was generated from the non-LDH domain name.

Further, as with conventional browsers, the Internet browser 40 is also configured to transmit to the DNS 52 a domain name resolution request that specifies a LDH domain name of a desired computer server, and to use the IP address returned from the DNS 52 to establish a communication session with the desired computer server.

It should also be understood that although the Internet browser 40 is preferably implemented as computer processing instructions, the Internet browser 40 may be implemented entirely or partially in electronics hardware instead, either in one or across many electronics hardware devices.

Invocation of the Internet browser 40 may be initiated by a user having direct physical access to the client computer 20. Optionally, invocation of the Internet browser 40 may be initiated via a client terminal in communication with the client computer 20 through the communications subsystem 34 over a communications network.

Figure 3:
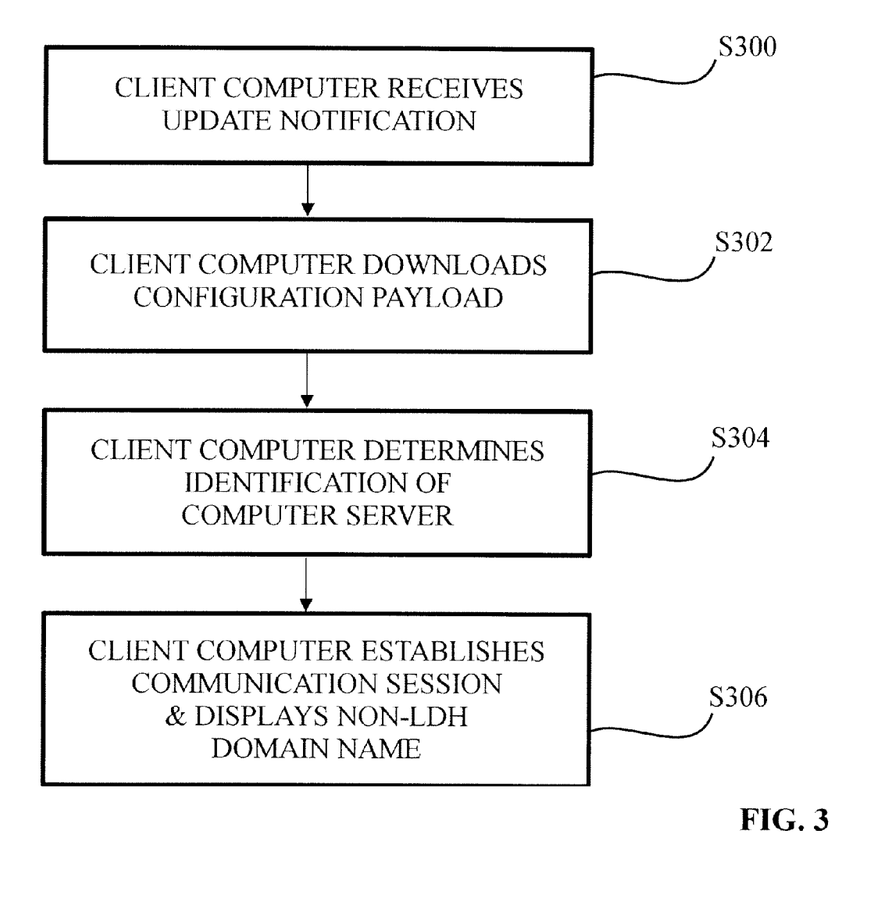
FIG. 3 is a flow chart that depicts the method for resolving a domain name.

FIG. 3 is a flow chart that depicts, by way of overview, the method for resolving a domain name. As shown, at step S300 the client computer 20 receives a domain name update notification that notifies the client computer 20 that the first computer server 50 is associated with the second computer server 54, and that the second computer server 54 has a non-LDH domain name. In response to the domain name update notification, the client computer 20 downloads a configuration payload from the registration server 60, at step S302.

At step S304, the configuration payload configures the client computer 20 to determine an identification of the second computer server 54 from the LDH domain name of the first computer server 50. As discussed above, the configuration payload may identify the LDH domain name of the first computer server 50, and the non-LDH domain name of the second computer server 54 that is associated with the first computer server 50. If the second computer server 54 also has a LDH domain, preferably the configuration payload also identifies the LDH domain name of the second computer server 54. In this situation, at step S304 the client computer 20 may query the configuration payload with the LDH domain name of the first computer server 50 for the identification of the second computer server 54.

Alternately, the configuration payload may configure the client computer 20 to determine the identification of the second computer server 54 via the registration server 60. In this situation, at step S304 the client computer 20 may query the registration server 60 with the LDH domain name of the first computer server 50 for the identification of the second computer server 54. As will be appreciated, in either situation, the configuration payload allows the client computer 20 to identify the non-LDH domain name (and optionally the LDH domain name) of the second computer server 54.

At step S306, the Internet browser 40 uses the identification of the second computer server 54 to establish a communication session with the second computer server 54 while displaying the associated non-LDH domain name. As will become apparent, the foregoing method allows a non-LDH domain name, that would otherwise not be registerable with the current domain name authority, to be registered and associated with a computer server, without having to modify any conventional domain name servers, such as the DNS 52.

Figure 4:
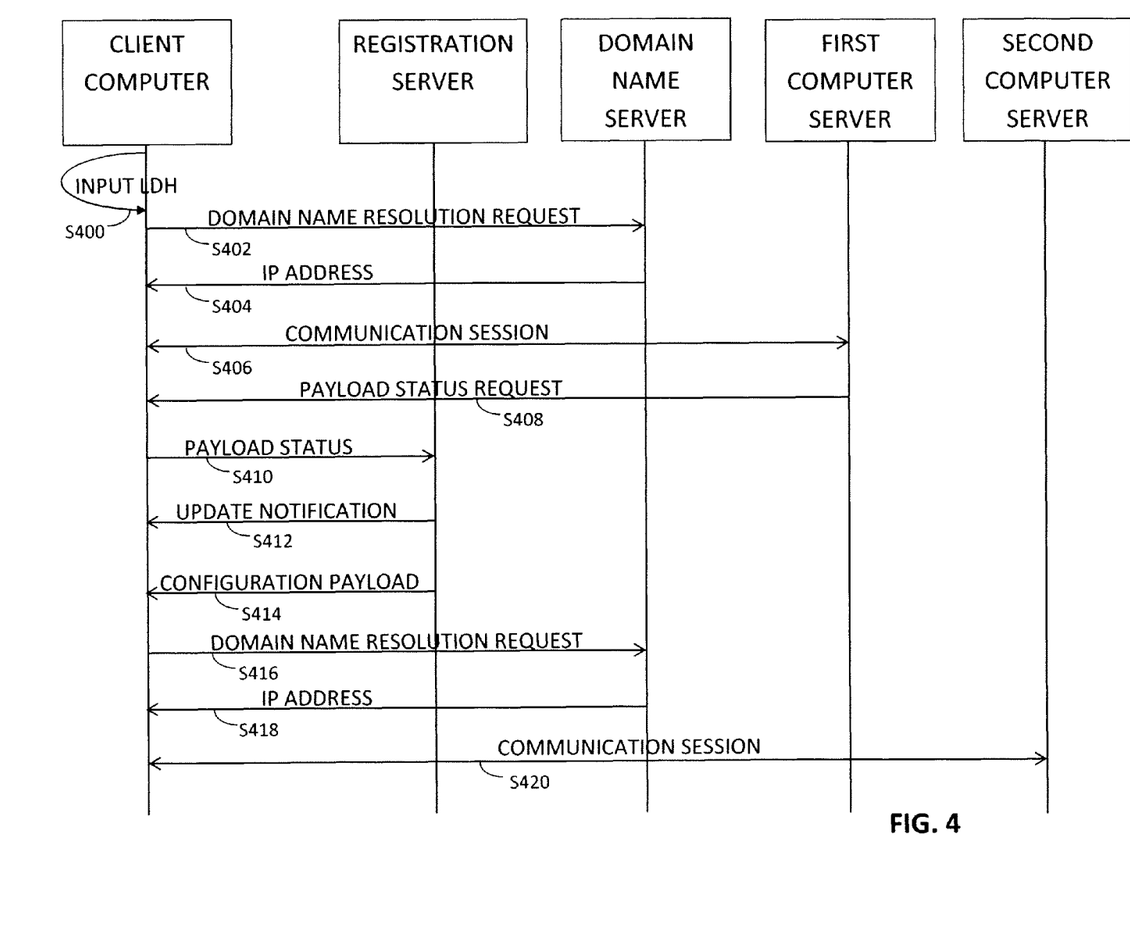
FIG. 4 is a data flow diagram depicting the method for resolving a domain name.

FIG. 4 is a data flow diagram that depicts, in detail, the method for resolving a domain name. As shown, at step S400 the user of the client computer 20 inputs the LDH domain name of the first computer server 50 into the address bar of the Internet browser 40. At step S402, the Internet browser 40 transmits to the DNS 52 a domain name resolution request that specifies the LDH domain name of the first computer server 50. As will be appreciated, the LDH domain name should be registered with the domain name registration authority, for use in association with the first computer server 50, prior to this step.

The DNS 52 uses the received LDH domain name to locate the IP address of the first computer server 50, and returns the located IP address to the browser 40, at step S404. At step S406, the Internet browser 40 establishes a communication session with the first computer server 50 at the specified IP address, and transmits the associated LDH domain name to the display subsystem 32 for displaying on the display device 38.

The first computer server 50 causes the client computer 20 to determine whether the client computer 20 has previously downloaded a configuration payload. To do so, at step S408 the first computer server 50 may download to the client computer 20 a Javascript program which, when executed by the Internet browser 40, may cause the Internet browser 40 to report to the registration server 60, at step S410, on the status (e.g. date, size, hash value) of the configuration payload (if any) that is stored on the client computer 20.

If the report received from the browser 40 indicates that no configuration payload has been saved on the client computer 20, or that the configuration payload saved on the client computer 20 does not include an entry for the first computer server 50, the registration server 60 transmits to the browser 40, at step S412, a domain name update notification that notifies the user of the client computer 20 that the first computer server 50 is associated with the second computer server 54, and that the second computer server 54 has a non-LDH domain name.

The update notification may provide the user with the option to cause the client computer 20 to download the configuration payload for the first computer server 50 from the registration server 60. The update notification may be in the form of a pop-up message appearing in the Internet browser 40 and may require confirmation from the user of the client computer 20 prior to downloading the configuration payload. Alternately, the update notification may cause the Javascript program to automatically download the configuration payload to the client computer 20 from the registration server 60.

At step S414, the client computer 20 downloads the configuration payload from the registration server 60. The configuration payload may include an entry for the first computer server 50, and identify the associated second computer server 54. Preferably, the configuration payload includes an entry for each first computer server 50 (and associated second computer server 54) that is registered with the registration server 60. The configuration payload may be implemented as a database file, a browser plug-in, or a specialty browser, that includes the association between the LDH domain name of the first computer server 50, and the non-LDH domain name and optionally the LDH domain name of the second computer server 54. The client computer 20 may install the database file, browser plug-in or specialty browser on the client computer 20, and thereafter use the configuration payload to perform the method.

Alternately, the browser plug-in may configure the Internet browser 40 to determine the association between the LDH domain name of the first computer server 50, and the non-LDH domain name and optionally the LDH domain name of the second computer server 54, via the registration server 60. Similarly, the specialty browser may be configured to determine the association between the LDH domain name of the first computer server 50, and the non-LDH domain name and optionally the LDH domain name of the second computer server 54, via the registration server 60.

As will be apparent, since the configuration payload directs the client computer 20 to associate the first computer server 50 with the second computer server 54, it is advantageous if the client computer 20 is able to trust the validity of the association between the first computer server 50 and the second computer server 54, as specified in the configuration payload. Therefore, to prevent the client computer 20 from downloading a configuration payload from a malicious registration server, preferably the configuration payload is digitally-signed with the private encryption key of the registration server 60 and is accompanied by the public certificate of the registration server 60. Upon receipt of the configuration payload, preferably the client computer 20 validates the configuration payload by verifying that the public certificate was issued to the registration server 60 by a trusted Certificate Authority, and using the public certificate to verify that the configuration payload was digitally-signed by the registration server 60.

Preferably, after validating the configuration payload, the browser (the Internet browser 40 or the specialty browser downloaded at step S414) queries the configuration payload (or the registration server 60) with the LDH domain name of the first computer server 50 for the identification of the second computer server 54.

Figure 5:
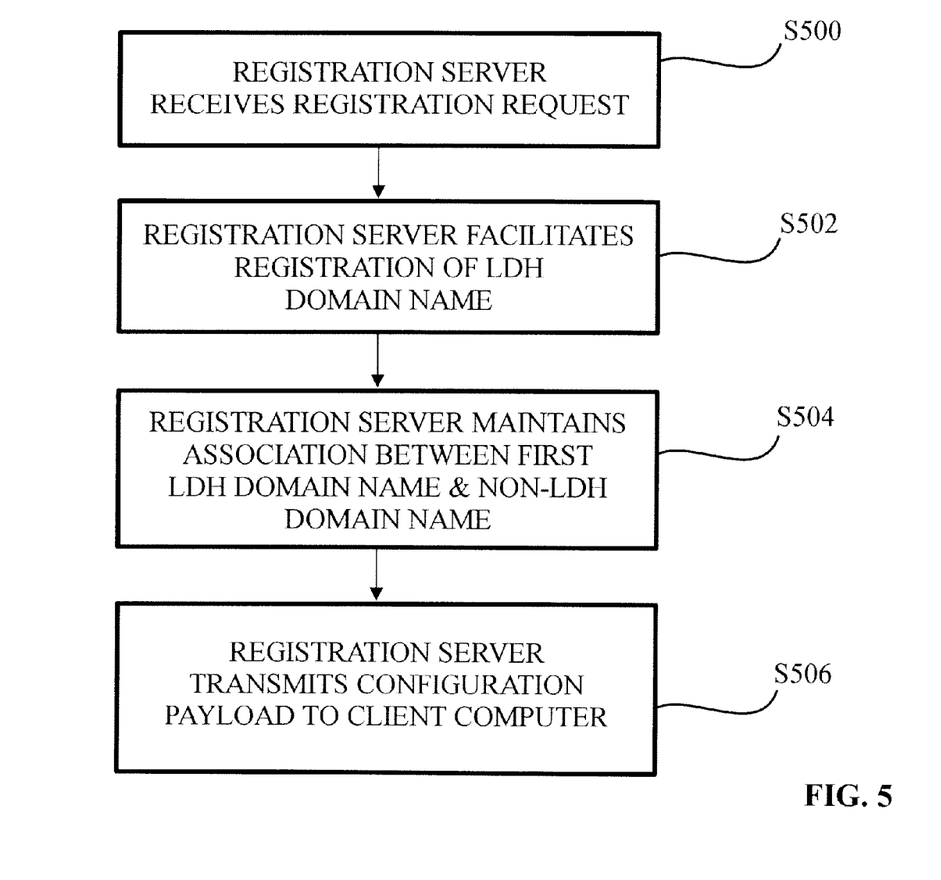
FIG. 5 is a flow chart that depicts the method for registering a non-LDH domain name.

If the retrieved identification comprises the non-LDH domain name and the LDH domain name of the second computer server 54, at step S416 the browser may transmit to the DNS 52 a domain name resolution request that specifies the LDH domain name of the second computer server 54. As will be appreciated, the LDH domain name of the second computer server 54 should be registered with the domain name registration authority, for use in association with the second computer server 54, prior to this step. Preferably the method described below, with reference to FIG. 5, is used to ensure that the non-LDH domain name and the LDH domain name of the second computer server 54 are associated with the LDH domain name of the first computer server 50, and the LDH domain name of the second computer server 54 is registered with the domain name registration authority.

The DNS 52 then uses the specified LDH domain name to locate the corresponding IP address, and returns the located IP address to the browser, at step S418. At step S420, the browser may use the returned IP address to establish a communication session with the second computer server 54 at the specified IP address, and transmits the associated non-LDH domain name to the display subsystem 32 for displaying on the display device 38.

However, if the retrieved identification comprises the non-LDH domain name of the second computer server 54, but does not identify a LDH domain name of the second computer server 54, in this situation it is assumed that the first computer server 50 and the second computer server 54 share the same IP address. Therefore, if the communication session with the first computer server (established at step S406) has been terminated, at step S416 the browser transmits to the DNS 52 a domain name resolution request that specifies the LDH domain name of the first computer server 50. Preferably the method described below, with reference to FIG. 5, is used to ensure that the non-LDH domain name of the second computer server 54 is associated with the LDH domain name of the first computer server 50.

The DNS 52 uses the specified LDH domain name to locate the corresponding IP address, and returns the located IP address to the browser, at step S418. At step S420, the browser uses the returned IP address to establish a communication session with the computer server at the specified IP address, and transmits the associated non-LDH domain name to the display subsystem 32 for displaying on the display device 38. If the communications session with the first computer server (established at step S406) has not been terminated, steps S416 to S418 are not performed, and the browser maintains the communications session but transmits the non-LDH domain name to the display subsystem 32 for displaying on the display device 38.

Alternately, instead of the identification retrieved for the second computer server 54 comprising the LDH domain name and non-LDH domain name of the second computer server 54 (or only the non-LDH domain name of the second computer server 54), the identification retrieved for the second computer server 54 may comprise the IP address of the second computer server 54. In this variation, the browser does not perform steps S416 to S418 to establish a communication session with the second computer server 54, but instead uses the IP address retrieved from the configuration payload to establish the communication session.

The following examples may assist with the understanding of the method. In the following example, it is assumed that a business owns the trade-mark EXAMPLE$, and a computer server that is accessible via the LDH domain name example-s.com, and wants to deploy a new computer server which, when accessed by the Internet browser 40 (or the specialty browser), displays the non-LDH domain name example-$.com. Since the non-LDH domain name example$.com is not registerable with the current domain name authority, the business may register a new LDH domain name (e.g. example555.com) with the domain name authority, and may use the registration server 60 to associate the original LDH domain name examples.com, the non-LDH domain name example$.com and the new LDH domain name example555.com.

Thereafter, after a user of the client computer 20 accesses the computer server 50 at the original LDH domain name examples.com at step S406 (for example, by entering the LDH domain name examples.com into the browser address bar), at step S414 the Internet browser 40 may download the configuration payload to the client computer 20. The browser (the Internet browser 40 or the specialty browser) may then automatically (i) query the configuration payload (or the registration server 60, as applicable) with the original LDH domain name examples.com for the new LDH domain name example555.com, (ii) initiate a domain name resolution request with the new LDH domain name example555.com at step S416, and (iii) initiate a communication session with the new computer server 54 at the specified IP address at step S420. The browser may display the non-LDH domain name example$.com in the browser address bar, while also obscuring all indications of the original LDH domain name examples.com (and the new LDH domain name example555.com) from the browser address bar, to thereby confirm to the user that the browser has accessed the new computer server 54 at the non-LDH domain name.

In the following example, the business has chosen not to register a new LDH domain name with the domain name authority, but instead simply associates the LDH domain name examples.com and the non-LDH domain name example$.com with the registration server 60. In this situation, after a user of the client computer 20 enters the LDH domain name examples.com into the browser address bar, and the Internet browser 40 downloads the configuration payload at step S414, the browser (the Internet browser 40 or the specialty browser) may then automatically (i) query the configuration payload (or the registration server 60, as applicable) with the LDH domain name examples.com for the non-LDH domain name example$.com, (ii) initiate a domain name resolution request with the LDH domain name examples.com at step S416, and (iii) initiate a communication session with the first computer server 50 at the specified IP address at step S420. The browser may display the non-LDH domain name example$.com in the browser address bar, while also obscuring all indications of the LDH domain name examples.com from the browser address bar, to thereby confirm to the user that the browser has accessed the second computer server 54 at the non-LDH domain name.

After the client computer 20 has received a configuration payload, and a user of the client computer 20 enters a non-LDH domain name into the browser, the browser may be configured to query the configuration payload (or the registration server 60, as applicable) for an entry associated with the non-LDH domain name. If such an entry exists, the browser may establish a communication session with a second computer server 54 having the associated non-LDH domain name. If no such entry exists, the browser may attempt to parse the non-LDH domain name into a LDH domain name. To do so, the browser may be configured to use certain non-LDH characters as delimiters to facilitate parsing of the non-LDH domain name. The browser may also be configured to give priority to some of these delimiting characters, such as ".", over other delimiting characters, such as "/".

For instance, continuing the foregoing examples, if the user of the client computer 20 enters the non-LDH domain name example$.com into the browser address bar, the browser may query the configuration payload (or the registration server 60, as applicable) with the non-LDH domain name example-$.com for the associated new LDH domain name example555.com. When the browser receives the new LDH domain name example555.com in response to the query, the browser may automatically initiate a domain name resolution request with the new LDH domain name example555.com, and initiate a communication session with the new computer server 54 at the specified IP address. Again, the browser would display the non-LDH domain name example$.com in the browser address bar, while also obscuring all indications of the new LDH domain name example555.com from the browser address bar, to thereby confirm to the user that the browser has accessed the new computer server 54 at the non-LDH domain name.

However, if the user of the client computer 20 enters the non-LDH domain name example.com/login.html into the browser address bar, the browser may again query the configuration payload (or the registration server 60, as applicable) with the non-LDH domain name example.com/login.html for a corresponding entry. If no such entry exists for the non-LDH domain name, the browser may use the non-LDH character "/" as a delimiter to parse the non-LDH domain name into the LDH domain name example.com and the file /login.html. The browser may then establish a communication session with the second computer server 54 at the LDH domain name example.com, and attempt to retrieve the file /login.html from the second computer server 54.

As another example, if the user of the client computer 20 enters the non-LDH domain name example$.com/login.html into the browser address bar, the browser may again query the configuration payload (or the registration server 60, as applicable) with the non-LDH domain name example$.com/login.html for a corresponding entry. If no such entry exists for the non-LDH domain name, the browser may use the non-LDH character "/" as a delimiter to parse the non-LDH domain name example$.com/login.html into the non-LDH domain name example$.com and the file /login.html, and may then query the configuration payload (or the registration server 60, as applicable) with the non-LDH domain name example$.com for a corresponding entry. As above, if the browser locates the entry in the configuration payload for the non-LDH domain name example$.com, the browser may automatically initiate a domain name resolution request with the associated LDH domain name example555.com, and initiate a communication session with the new computer server 54 at the specified IP address. If no such entry exists for the non-LDH domain name example$.com, the browser may use the example$.com as the basis for an Internet query, as is known in the art.

In each of the foregoing examples, the client computer 20 is configured to download the configuration payload from the registration server 60 after accessing the first computer server 50. In one variation, after the initial download of the configuration payload to the client computer 20, the configuration payload thereafter directs the client computer 20 to periodically download configuration payload updates from the registration server 60. Further, in another variation, the first computer server 50 updates the configuration payload saved on the client computer 20 when the client computer 20 accesses the first computer server 50. By periodically downloading updates from the registration server 60, and/or updating the configuration payload directly from the first computer server 50, the likelihood of the client computer 20 having an up-to-date configuration payload is increased.

FIG. 5 is a flow chart that depicts the method for registering a non-LDH domain name. At step S500, the registration server 60 receives a registration request comprising a non-LDH domain name. As discussed above, the non-LDH domain name includes at least one non-LDH character, and is associated with the second computer server 54. The registration server 60 may receive the registration request from any computer terminal that is interfaced with the communications network 10, including any of the client computers 20.

At step S502, optionally the registration server 60 facilitates registration of a LDH domain name with the DNS 52. The LDH domain name is associated with the non-LDH domain name, and includes at least one character but excludes non-LDH characters. To facilitate registration of the LDH domain name, the registration request received by the registration server 60 may include the LDH domain name. Alternately, the registration server 60 may generate the LDH domain name.

In accordance with an outcome of the registration facilitating, at step S504 the registration server 60 maintains an association between the LDH domain name and the non-LDH domain name, and transmits to one of the client computers 20 a configuration payload that facilitates establishment of a communication session between the client computer 20 and the computer server associated with the non-LDH domain name.

Preferably, the configuration payload transmitted by the registration server 60 configures the client computer 20 to display the non-LDH domain name in the browser address bar of the client computer 20, while also obscuring from the browser address bar all indications of the LDH domain name. Accordingly, the owner of the non-LDH domain name need not include the owner's trade-mark or trade-name in the LDH domain name for the trade-mark or trade-name to be displayed in the browser address bar of the client computer 20. Instead, since the LDH domain name is preferably not displayed in the browser address bar of the client computer 20, the LDH domain name can have any format as long as it is registerable with the DNS 52.

Numerous methods are possible for generating the unique LDH domain name for registration in step S502. The LDH domain name may be incorporated into the registration request. The registration server 60 may randomly generate the unique LDH domain name. For example, the registration server 60 may use the non-LDH domain name, received at step S500, as an input to a suitable transformation algorithm, such as a hash algorithm, to thereby transform the received non-LDH domain name into a unique LDH domain name.

Alternately, the registration server 60 may be configured to transform each non-LDH character in the non-LDH domain name into a unique character string representative of the respective non-LDH character, to thereby transform the non-LDH domain name into a unique LDH domain name. As an example, the registration server 60 may be configured to transform the non-LDH character "$" into the character string "DO010". As a result, the registration server 60 would transform the non-LDH domain name "example$.com" into the LDH domain name "exampleDO010.com".

The LDH domain name used at step S502 may be the domain name of the second computer server 54. In this case, should the registration server 60 determine from the domain name authority that the LDH domain name is already registered as a domain name, at step S504 the registration server 60 may halt the registration process, or may prompt the user of the client computer 20 for an alternate LDH domain name for the second computer server 54. Alternately, at step S504, the registration server 60 may generate the alternate LDH domain name for the second computer server 54. The registration server 60 may be configured to include an integer in the LDH domain name, and to increment the integer after each unsuccessful registration attempt of the LDH domain name. For example, if registration of the LDH domain name "ldhdomain0001.com" was unsuccessful, the registration server 60 may attempt to register the LDH domain name "ldhdomain0002.com", and so on.

Alternately, the LDH domain name used at step S502 may be the domain name of the first computer server 50. In this case, should the registration server 60 determine from the domain name authority that the LDH domain name is already registered as a domain name, at step S504 the registration server 60 may determine whether the person requesting the registration of the LDH domain name owns the LDH domain name. To do so, the registration server 60 may query the domain name registration authority for ownership information of the LDH domain name. The registration request transmitted to the registration server 60 may include an identification of the person requesting the registration. For example, the registration request may be digitally signed by, and accompanied by the public certificate of, the person that transmitted the registration request. The registration process may then proceed to step S506 in accordance with a correspondence between the person requesting the registration of the LDH domain name and the owner of the LDH.

As discussed above with reference to FIG. 4, the configuration payload may include the associations between the LDH domain names and the non-LDH domain names, and the configuration payload may configure the client computer 20 to query the configuration payload with a non-LDH domain name to establish the communication session with the computer server at the associated non-LDH domain name. Alternately, since the registration server 60 maintains the association between the LDH domain name and the non-LDH domain name, the configuration payload may configure the client computer 20 to query the registration server 60, or a mirror server therefor, with a non-LDH domain name to allow the client computer 20 to establish the communications session with the computer server at the associated non-LDH domain name.

Preferably, the registration request includes the LDH domain name of the associated first computer server 50. Therefore, where the LDH domain name received or generated by the registration server at step S502 is the domain name of one of the second computer servers 54, prior to transmitting the configuration payload to the client computer 20, at step S506 the registration server 60 may incorporate into the configuration payload the LDH domain name of each first computer server 50, and for each first computer server 50 the non-LDH domain name and the LDH domain name of the associated second computer server 54.

Alternately, where the LDH domain name received by the registration server 60 at step S502 is the domain name of one of the first computer servers 50, prior to transmitting the configuration payload to the client computer 20, at step S506 the registration server 60 may incorporate into the configuration payload the LDH domain name of each first computer server 50, and for each first computer server 50 the non-LDH domain name of the associated second computer server 54.

Further, as discussed above, to allow the client computer 20 to be able to trust the validity of the associations specified in the configuration payload, preferably the configuration payload is digitally-signed with the private encryption key of the registration server 60 and is accompanied by the public certificate of the registration server 60. Accordingly, upon receipt of the configuration payload at step S504, the client computer 20 may use the public certificate to validate the configuration payload and, in accordance with an outcome of the configuration payload validation, query the configuration payload (or the registration server 60) for the identification of the computer server associated with a non-LDH domain name. The client computer 20 may be configured, such that should the payload validation fail, the client computer 20 does not attempt to determine the identification of the computer server or to establish the communication session with the computer server. The client computer 20 may also be configured to display an indication of the failed validation on the display device 38.

The invention claimed is:

1. A method for resolving a domain name including a non-LDH ("letter, digit, or hyphen") character, comprising:
   a client computer receiving a domain name update notification for a first computer server, the first computer server having a first LDH domain name comprising at least one character but excluding non-LDH characters;
   in response to the domain name update notification, the client computer downloading a configuration payload from a registration server, the registration server maintaining an association between the first computer server and a second computer server, the configuration payload linking the first computer server to a non-LDH domain name associated with the second computer server and configuring the client computer to determine an identification of the second computer server from the first LDH domain name, the non-LDH domain name having at least one non-LDH character; and
   the client computer using the identification of the second computer server to establish a communication session therewith while displaying the associated non-LDH domain name.

2. The method of claim 1 wherein the identification of the second computer server comprises a second LDH domain name comprising at least one character but excluding non-LDH characters.

3. The method of claim 2 wherein the second LDH domain name is distinct from the first LDH domain name or resolves to the first computer server.

4. The method of claim 1 wherein the registration server is distinct from the first computer server.

5. The method of claim 1 wherein the displaying of the associated non-LDH domain name comprises the client computer displaying the non-LDH domain name on an Internet browser thereof while obscuring all indication of the first LDH domain name.

6. The method of claim 1 wherein the configuration payload comprises an Internet browser, the downloading comprises the client computer installing the Internet browser on the client computer prior to the querying step, and the communication session establishing step comprises the Internet browser establishing the communication session.

7. The method of claim 6 wherein the Internet browser is configured with the association between the first computer server and the non-LDH domain name associated with the second computer server.

8. The method of claim 1 wherein the configuration payload comprises a browser plug-in, and the downloading comprises the client computer, prior to the querying step, installing the browser plug-in in an Internet browser operating on the client computer, the browser plug-in directing the Internet browser to perform the communication session establishing.

9. The method of claim 8 wherein the browser plug-in includes the association between the LDH domain name of the first computer server and the non-LDH domain name of the second computer server.

10. The method of claim 1 wherein the identification of the second computer server comprises an IP (Internet Protocol) address.

11. The method of claim 1 further comprising the client computer querying the configuration payload with a non-LDH domain name to locate the identification of the second computer, and using the located identification to establish a communication session with the second computer while displaying the associated non-LDH domain name.

12. The method of claim 2 further comprising:
the registration server receiving a registration request comprising the first LDH domain name, the second LDH domain name, and the non-LDH domain name;
the registration server facilitating registration of the second LDH domain name with a domain name server; and
in accordance with an outcome of the registration facilitating, the registration server maintaining an association between the first LDH domain name, the second LDH domain name, and the non-LDH domain name.

13. The method of claim 12 wherein the facilitating registration step comprises the registration server verifying a correspondence between a party requesting the registration and an identification of an owner of the first LDH domain name, and the registration server maintaining comprises the registration server maintaining the association in accordance with an outcome of the registration server verifying.

14. The method of claim 2 wherein the client computer using the identification of the second computer server to establish a communication session therewith comprises the client computer transmitting a request to a domain name server for an IP address associated with the second LDH domain name.

15. The method of claim 1 wherein the configuration payload further comprises a public certificate associated with a private key of the registration server, and the querying comprises the client computer validating the configuration payload with the public certificate, and querying the configuration payload in accordance with an outcome of the configuration payload validating.

16. A computer-readable medium carrying computer processing instructions stored thereon, that when executed by a computer causes the computer to implement the method of claim 1.

17. A client computer system comprising:
a display device;
a data processor in communication with the display device and configured to:
(i) receive an update notification for a first computer server and to receive a configuration payload from a registration server, the configuration payload linking a first computer server to a non-LDH domain name associated with a second computer server and configuring the client computer to determine an identification of the second computer server from a LDH domain name, the non-LDH domain name having at least one non-LDH ("letter, digit, or hyphen") character, the LDH domain name being associated with the first computer server and comprising at least one character but excluding non-LDH characters; and
(ii) use the identification of the second computer server to establish a communication session therewith while displaying the associated non-LDH domain name on the display device.

18. A method for registering a domain name including a non-LDH ("letter, digit, or hyphen") character, comprising:
a registration server receiving a registration request comprising a non-LDH domain name, the non-LDH domain name having at least one non-LDH character;
the registration server facilitating registration of a LDH domain name with a domain name server, the LDH domain name being associated with the non-LDH domain name and comprising at least one character but excluding non-LDH characters; and
in accordance with an outcome of the registration facilitating, the registration server maintaining an association between the LDH domain name and the non-LDH domain name and transmitting a configuration payload to a client computer, the configuration payload facilitating establishment of a communication session between the client computer and a computer server associated with the non-LDH domain name.

19. The method of claim 18 wherein the configuration payload configures the client computer to:
query the configuration payload with the LDH domain name for an identification of a computer server associated with therewith; and
use the identification of the computer server to establish the communication session therewith while displaying the associated non-LDH domain name.

20. The method of claim 19 wherein the client computer is pre-configured with the configuration payload, and prior to the configuration payload transmitting, one of the registration server and the client computer determining whether the associations in the pre-configured client computer configuration payload are up-to-date.

* * * * *